Dec. 22, 1953  H. E. HOAGLAND  2,663,428
COLANDER
Filed June 30, 1950
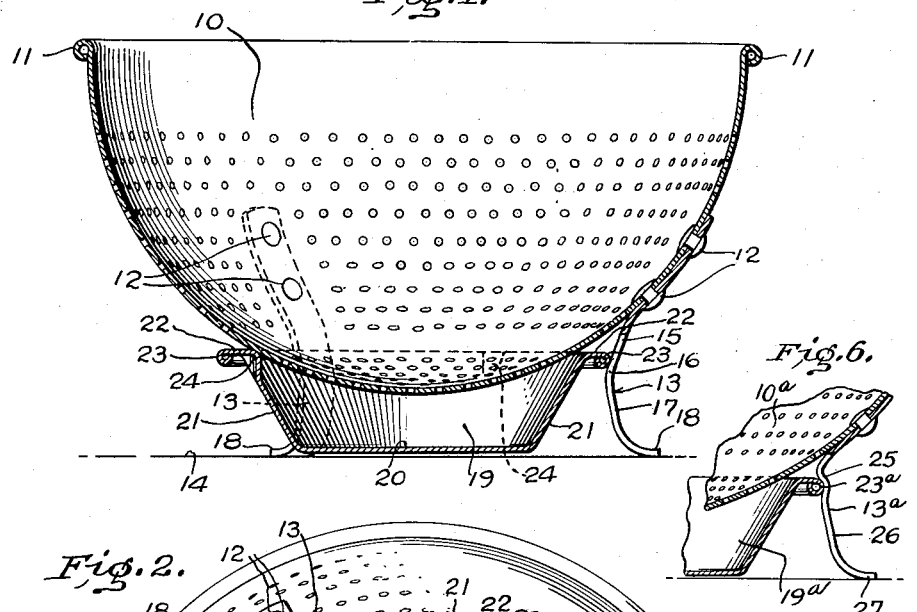
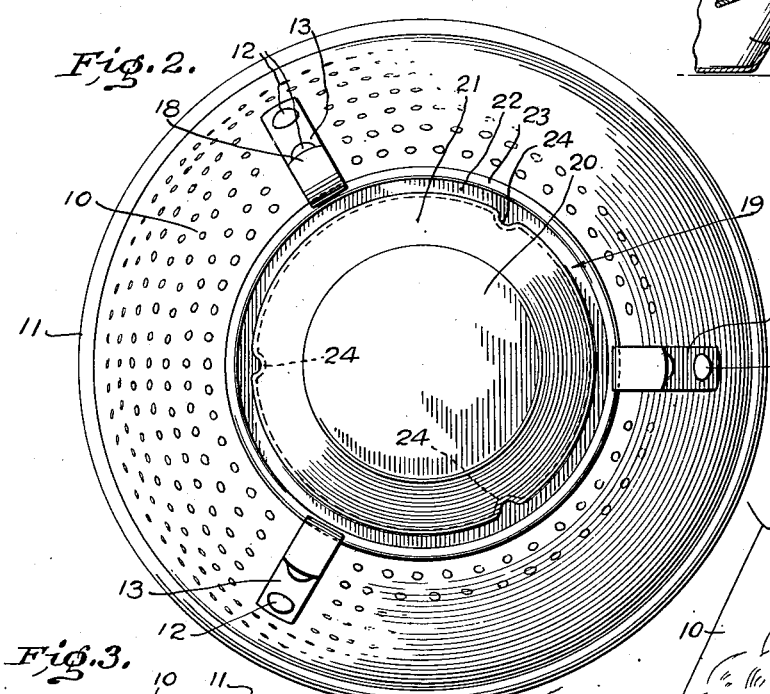
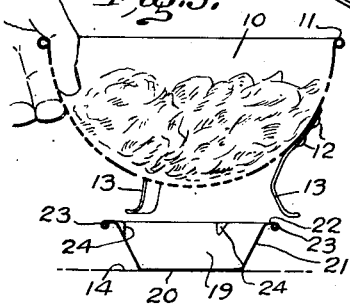
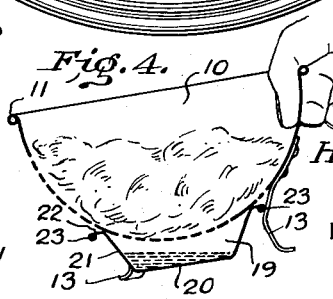
Hortense E. Hoagland
INVENTOR
BY Reginald W. Hoagland
ATTORNEY Patented Dec. 22, 1953

2,663,428

UNITED STATES PATENT OFFICE 2,663,428

COLANDER

Hortense E. Hoagland, Flint, Mich.

Application June 30, 1950, Serial No. 171,371

6 Claims. (Cl. 210—155)

The present invention relates to colanders and aims to provide a novel and improved utensil of this character whereby a container is arranged and supported beneath a strainer bowl for catching drippings from the strainer bowl.

Heretofore, the general practice has been to place the colander in the sink or on the drainboard after washing foods and/or when draining liquids from foods in the colander, or if it is desired to save the liquid, to place the colander in a large bowl or other vessel for catching the liquid. In both cases, it is necessary that some type of liquid-receiving container remain under the colander to catch drippings if the colander is to be moved to a worktable or stove for preparing the food for serving or for cooking. A large container of the approximate diameter of the colander is required to efficiently support the colander therein during transferring and handling thereof; said large container takes up a considerable amount of space on a table or stove and, usually being heavy, is very awkward and difficult to handle. Should a small, shallow container of a size that would fit within the support of the colander without being attached thereto be used, much difficulty would be experienced in manipulating both the colander and the container during the transferring and locating of parts relative to one another.

It is therefore proposed to provide a novel and improved colander having a pan carried bodily beneath the strainer bowl within and not interfering with the support thereof for catching and retaining drippings during complete or partial draining of liquids from foods or other substances placed in the colander.

Another object of the invention is to provide a colander in accordance with the above objects whereby the drip pan may be quickly and conveniently attached and detached from the strainer and support portion for permitting use of the colander with or without the pan, said attachment of the pan being accomplished by merely placing the strainer portion of the colander over the pan and applying a slight downward pressure on the colander, while detachment is made simply by forcing and holding the drip pan to the surface upon which the colander rests and lifting the strainer portion above and away from said pan.

It is also an object of the invention to provide a colander as set forth in the preceding objects which is simple and substantial in construction, economical to manufacture, and thoroughly efficient and practical in use.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a vertical section through the improved colander showing the same resting on a surface with the drip pan attached;

Figure 2 is a bottom plan view of the completely assembled colander;

Figures 3, 4, and 5 are diagram views in section showing, respectively, the strainer portion being placed over the drip pan for attachment of parts, the drip pan carried bodily by the strainer-supporting portion during transfer of the colander to another location, and the emptying of contents from the strainer portion into a vessel while pouring strained liquid from the pan outwardly of the vessel; and Figure 6 is a fragmentary vertical section showing a modified form of attachment of the pan beneath the strainer portion.

Referring now more specifically to the accompanying drawings, wherein like numerals designate similar parts throughout the various views, there is indicated by the numeral 10 a strainer which, for the purpose of illustration, is shown as a perforated bowl constructed with a thin metallic wall of a hemispherical shape and with an annular, rolled bead 11 at the upper edge thereof. Attached to the exterior surface of the wall of the bowl, by rivets or the like, at spaced intervals therearound, are legs 13, preferably three in number, which extend downwardly and engage a surface 14 for supporting the perforated bowl above said surface.

The upper ends of the legs 13 at their attachment to the bowl 10 conform to the curvature of the wall of the bowl for a short distance of their length, then project inwardly and towards one another at a slight angle as they extend downwardly for another short distance, as at 15, whereupon they are then gradually curved, as at 16, and project slightly outward at an angle away from each other as they continue to extend downwardly, as at 17, and are then again curved outwardly until the lower ends 18 thereof are projecting on substantially horizontal planes away from each other.

Located beneath the perforated bowl 10, centrally thereof, and between the legs 13, is a drip pan 19 which is comprised of a flat bottom 20, tapered cylindrical wall 21 flared outwardly as it extends upwardly, an outwardly extending upper annular flange 22 with a rolled edge 23 at its periphery, and a plurality of spaced indents 24 at the joining portion of the tapered cylindrical wall 21 to the annular flange 22. While the indents 24 space the upper portion of the tapered cylindrical wall 21 of the pan 19 away from the exterior surface of the perforated wall of the bowl 10 to permit liquids passing through perforations located above the flange 22 of the pan and running down said perforated wall to enter into the pan 19 and to permit a pouring of liquids from the pan, it is to be understood that such spacing is of a very slight degree for eliminating to a great extent the possibility of liquids in the pan being splashed out of the pan during transferring and handling of the colander.

When the pan is attached, the indents 24 are in engagement with the wall of the bowl 10, the lower central portion of the hemispherical wall of the perforated bowl where dripping of liquid from the bowl occurs is within the tapered cylindrical wall 21 of the pan, the bottom 20 of the pan is spaced slightly above the surface 14 upon which the colander rests, and the rolled edge 23 of the annular flange 22 is in engagement with the angled portions 15 of the legs 13 slightly above the curved portions 16 thereof, as shown in Figure 1.

The diameter of the outermost curved surface of the rolled edge 13 is slightly greater than an imaginary circle drawn at the most constricted space between the legs 13, which is at the curved portions 16 of said legs. This causes a slight outward flexing of the legs when forcing the rolled edge 23 of the pan along angled portions 15 and 17 of the legs and past the constricted curved portions 16 thereof to attach or detach the pan to or from the bowl, and produces sufficient tension on the periphery of the pan to support the weight of said pan when completely filled with liquid.

The annular flange 22, while locating the rolled edge 23 relative to the construction of the legs 13 for yieldably holding the pan beneath the bowl, is also a hand-engaging portion for the pan when detaching same from the bowl. The contour of the bowl relative to the angle of the flange provides an annular, V-shaped finger-engaging space between said flange and bowl permitting the flange to function as a handle for detachment of parts without forming an obstruction which would have to be avoided by straddling the legs thereover when assembling parts.

The tapering of the cylindrical wall 21 of the pan 19 to a diameter of increased size at its upper portion permits a complete pouring of liquids from the pan at a less angle of inclination than that if a true cylindrical wall were provided. Thus, when the pan is attached beneath the perforated bowl 10 with substance in the bowl and it is desired to pour liquid from the pan, there will be less likelihood of spilling the substance from the bowl into the sink or into another vessel which is receiving the liquid.

Often, it is necessary that certain foods be completely drained of liquids before serving or cooking, and when the food is of a nature that requires considerable time to properly drain the liquid from same, an ordinary colander with the food to be drained therein must remain in a sink or on a drainboard unless placed in a large, cumbersome vessel during the complete draining.

When washing foods in the perforated bowl over a sink or the like, the pan 19 may be either attached or detached. When attached, any water in the pan after washing can be conveniently poured therefrom by tilting the colander with one hand at an angle such as that indicated in Figure 5 while holding the contents in the bowl with the other hand. Should the pan be detached during the washing operation, all that is required to attach same to catch further dripping of water from the contents in the bowl is to hold the pan in the palm of one hand and the bowl with the other hand while forcing the two together, or to place the pan 19 on a flat surface and lower the bowl thereover, as shown in Figure 3, until the rolled edge 23 of the pan is forced past the constricted leg area of the supporting legs 13 and said legs are in engagement with said surface. Due to the angle on which the lower portions 17 of the legs are arranged, the pan will be shifted sidewise to a position centrally of the bowl during the lowering of the bowl. The colander may then be transferred to a worktable or stove for preparing food for serving or for cooking while draining of liquid continues without the liquid dripping on the table or stove.

At the time of dumping the contents of the perforated bowl into another container, the liquid drained from the substance may be poured into a sink or the like, as shown in Figure 5. This merely requires that the operation of transferring the substance to the other container be performed over a sink or other disposal element.

When it is desired to save liquid drained from food placed in the perforated bowl and the quantity of the liquid is greater than the pan's capacity, the major portion of the liquid can be caught in a receptacle held or placed under the bowl prior to attaching the pan 19 to catch the slowly dripping, remaining portion of the liquid.

The form of invention illustrated in Figure 6 shows the legs constructed to produce a spacing of the pan 19ª from the perforated bowl 10ª, thereby omitting the indents 24 on said pan. The legs 13ª in this case, after being attached to the bowl, are provided with reversed curve portions, as at 25, which are substantially S-shaped before projecting downwardly at angles extending slightly outward and away from each other, as at 26, to the curved, horizontally extending foot portions 27. The reversed curve portions 25 form seats that limit upward motion of the pan with respect to the bowl and provide a yieldable, constricted area through which the rolled edge 23ª of the pan must be forced to engage into the seats when attaching the pan to the bowl.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

While there is shown and described a drip pan, a perforated bowl, and supporting legs therefor of metallic construction, it is to be understood that a drip pan and a strainer bowl constructed in any approved manner, of any suitable material, and with legs or any other type of support therefor may be employed so long as the support locates and holds the strainer bowl and drip pan relative to one another.

What is claimed:

1. A colander comprising a strainer bowl substantially hemispherical in shape, a supporting structure fixed to the underside of said bowl and extending downwardly therefrom outwardly of the vertical center thereof, a circular liquid-retaining pan of considerably less diameter than said strainer bowl located centrally beneath said strainer bowl and inwardly of said supporting structure, said pan being engaged by said supporting structure and detachably held therewith, and means on said pan engaging the exterior surface of said bowl so as to space the major upper portion of said circular pan slightly out of engagement with the exterior surface of said strainer bowl.

2. A device as defined in claim 1 wherein said supporting structure comprises a plurality of downwardly and outwardly extending members each having an inwardly directed camming surface thereon engageable beneath the peripheral edge portion of said pan requiring springing of said members outwardly when said pan is engaged by said camming surfaces.

3. A device as defined in claim 1 wherein said supporting structure comprises a plurality of downwardly and outwardly extending members each having an inwardly directed camming surface thereon engageable beneath the peripheral edge portion of said pan requiring springing of said members outwardly when said pan is engaged by said camming surfaces, said supporting members having their lower ends in substantially the same plane as the plane of the bottom of said pan when said pan is engaged by said camming surfaces.

4. A colander comprising a strainer bowl substantially hemispherical in shape, a supporting structure fixed to said bowl and extending downwardly therefrom outwardly of the vertical center thereof, a circular liquid-retaining pan of considerably less diameter than said strainer bowl located centrally beneath said strainer bowl with the cylindrical wall of said pan in close proximity to the curved surface of said bowl, said pan engaging said supporting structure so as to bodily carry same with said strainer bowl, and spaced indents on the upper portion of the cylindrical wall of said pan in engagement with the outer curved surface of said bowl for spacing the major portion of the cylindrical wall from said bowl.

5. A colander comprising a substantially hemisphere-shaped strainer bowl, a plurality of legs of yieldable material fixed to said bowl and extending downwardly and outwardly therefrom and located outwardly of the vertical center thereof, a circular pan of considerably less diameter than said strainer bowl beneath said bowl and inwardly of said legs, and an annular rolled edge on the upper portion of the circular wall of said pan and of a diameter greater than that of said wall, said yieldable legs detachably engaging the periphery of said annular rolled edge to clamp the upper portion of the pan against the exterior surface of the strainer bowl upon lowering the strainer bowl on the pan to a position whereby the lower ends of the legs on the strainer bowl are in substantially the same plane as the plane of the bottom of the pan.

6. A colander comprising a substantially hemisphere-shaped strainer bowl, a plurality of legs fixed to said bowl and extending downwardly and outwardly therefrom and located outwardly of the vertical center thereof, said legs being yieldable in an outward direction, a pan with a circular wall of considerably less diameter than said strainer bowl beneath said strainer bowl and inwardly of said legs, an annular rolled edge on the upper portion of the wall of said pan and of a diameter greater than that of said circular wall, and an inwardly directed angled portion on each leg extending downwardly on the inner sides of said yieldable legs detachably engaging said annular rolled edge, said engagement of said legs with said rolled edge yieldably clamping the upper portion of the pan against the exterior surface of said strainer bowl with the lower curved central portion of said strainer bowl within the circular wall of said pan when the lower ends of the legs on the strainer bowl are in substantially the same plane as the plane of the bottom of the pan.

HORTENSE E. HOAGLAND.

References Cited in the file of this patent

UNITED STATES PATENTS

| Number | Name | Date |
|--------|------|------|
| 929,717 | Self | Aug. 3, 1909 |
| 959,581 | Newton | May 31, 1910 |
| 1,753,693 | Carpender | Apr. 8, 1930 |
| 2,541,094 | Pesenti | Feb. 13, 1951 |